(12) United States Patent
Gu et al.

(10) Patent No.: US 9,521,072 B2
(45) Date of Patent: Dec. 13, 2016

(54) METHOD AND NETWORK DEVICE FOR DISTRIBUTING MULTI-PROTOCOL LABEL SWITCHING LABELS

(71) Applicant: Huawei Technologies Co., LTD, Shenzhen (CN)

(72) Inventors: Rui Gu, Shenzhen (CN); Guoyi Chen, Shenzhen (CN); Jie Dong, Shenzhen (CN); Qing Zeng, Shenzhen (CN)

(73) Assignee: HUAWEI TECHNOLOGIES CO., LTD, Shenzhen (CN)

( * ) Notice: Subject to any disclaimer, the term of this patent is extended or adjusted under 35 U.S.C. 154(b) by 619 days.

(21) Appl. No.: 13/890,170

(22) Filed: May 8, 2013

(65) Prior Publication Data

US 2013/0250966 A1 Sep. 26, 2013

Related U.S. Application Data

(63) Continuation of application No. PCT/CN2011/075229, filed on Jun. 2, 2011.

(30) Foreign Application Priority Data

Nov. 9, 2010 (CN) .......................... 2010 1 0538280

(51) Int. Cl.
*H04L 12/28* (2006.01)
*H04L 12/723* (2013.01)
*H04L 12/715* (2013.01)

(52) U.S. Cl.
CPC ............. *H04L 45/507* (2013.01); *H04L 45/04* (2013.01)

(58) Field of Classification Search
CPC ...... H04L 12/56; H04L 2012/56; H04L 49/10; H04L 49/15; H04L 49/255; H04L 12/5601; H04L 2012/5609; H04L 49/256; H04L 49/1553; H04L 2012/5629
(Continued)

(56) References Cited

U.S. PATENT DOCUMENTS

2010/0027549 A1* 2/2010 Satterlee ............. H04L 12/4641
370/395.31
2010/0208615 A1* 8/2010 Soon ..................... H04L 12/462
370/254

FOREIGN PATENT DOCUMENTS

CN 1921453 2/2007
CN 101052011 10/2007

OTHER PUBLICATIONS

Written Opinion of the International Searching Authority including International Search Report, in corresponding International Application No. PCT/CN2011/075229 dated Sep. 15, 2011, 8 pages.
(Continued)

*Primary Examiner* — Brenda H Pham
(74) *Attorney, Agent, or Firm* — Slater Matsil, LLP

(57) ABSTRACT

A method and network device for distributing Multi-Protocol Label Switching (MPLS) labels are provided by the present invention. The method for distributing the MPLS labels includes: a first device receives a Border Gateway Protocol (BGP) protocol message transmitted from a second device, wherein the BGP protocol message carries a service identifier of the second device; the first device establishes, according to the service identifier of the first device and the service identifier of the second device, a corresponding relationship between the first device and the second device; the first device distributes a MPLS label for the corresponding relationship. The present invention realizes that the MPLS labels are distributed for some type of the specific logical relationship between the two nodes in the BGP protocol, so that the network devices running the BGP
(Continued)

protocol can efficiently obtain the MPLS label corresponding to the specific logical relationship.

13 Claims, 4 Drawing Sheets

(58) Field of Classification Search
USPC .................. 370/389, 386, 396, 395.2, 395.3, 370/395.5, 400
See application file for complete search history.

(56) References Cited

OTHER PUBLICATIONS

E. Rosen, Memo "BGP/MPLS IP Virtual Private Networks (VPNs)", Request for Comments: 4364, Obsoletes: 2547, Category: Standards Track, Rosen & Rekhter, Juniper Networks, Inc., Feb. 2006, 47 pages.

M. Lasserre, Ed. et al., Memo "Virtual Private LAN Service (VPLS) Using Label Distribution Protocol (LDP) Signaling", Network Working Group, Request for Comments: 4762, Category: Standards Track, Alcatel-Lucent, Jan. 2007, 32 pages.

K. Kompella, Ed. et al., Memo "Virtual Private LAN Service (VPLS) Using BGP for Auto-Discovery and Signaling", Request for Comments: 4761, Category: Standards Track, Juniper Networks, Jan. 2007, 29 pages.

E. Rosen, et al., Internet-Draft, Expires: Nov. 4, 2006, Memo, "Provisioning, Autodiscovery, and Signaling in L2VPNs draft-ietf-I2vpn-signaling-08.txt", Cisco Systems, Inc., May 3, 2006, 40 pages.

* cited by examiner

METHOD AND NETWORK DEVICE FOR DISTRIBUTING MULTI-PROTOCOL LABEL SWITCHING LABELS

CROSS-REFERENCE TO RELATED APPLICATIONS

This application is a continuation of International Application No. PCT/CN2011/075229, filed on Jun. 2, 2011, which claims priority to Chinese Patent Application No. 201010538280.3, filed on Nov. 9, 2010, both of which are hereby incorporated by reference in their entireties.

TECHNICAL FIELD

The present invention relates to the field of communications, and more particularly to a method and a network device for distributing MPLS labels.

BACKGROUND

MPLS is an abbreviation of Multi-Protocol Label Switching. MPLS makes use of short labels with fixed length to encapsulate packets, and achieves quick forwarding at a data plane. At a control plane, MPLS possesses strong and flexible routing functionality of IP network, and can satisfy requirements of various new applications on the network.

Such technique was initially proposed in order to enhance the forwarding speed of the router. In comparison with a traditional IP routing mode, in the technique, during forwarding data, only at the network edge is an IP message header analyzed, while the IP message header does not need to be analyzed at each hop, thus reducing the processing time.

With the development of the ASIC technology, the routing searching speed is no longer a bottleneck blocking development of the network. This makes unobvious the advantage of MPLS in terms of enhancing the forwarding speed. However, the characteristics of MPLS in supporting multi-layer labels and connection oriented forwarding plane enable MPLS to be widely applied in such aspects as virtual private network (VPN), traffic engineering and quality of service (QoS), etc.

MPLS performs forwarding on the basis of labels, and assignment as well as distribution of MPLS labels can be statically configured or achieved via such protocols as LDP, RSVP-TE and BGP, etc. RSVP-TE is mainly used to achieve the establishment of TE LSP, LDP can be applied in the establishment of LSP with topologically driven route or serve as a signaling protocol of the pseudo-wire (PW) label in L2VPN, and the border gateway protocol (BGP) mainly extends the signaling protocol serving as the private network routing label under VPN and establishes LSP of the label routing under a cross-domain VPN.

Currently, the BGP protocol running on a certain device distributes, only according to a specific service element, such as VPN routing, a VPN instance, a VPLS instance, etc., the same one MPLS label or the same one group of MPLS labels corresponding to the service element to all other devices having established BGP protocol neighborhood with the current device.

SUMMARY OF THE INVENTION

It is one objective of the present invention to provide a method and a network device for distributing MPLS labels.

The technical solutions of the present invention are as follows.

The present invention discloses a method for distributing multi-protocol label switching (MPLS) labels, includes receiving, by a first device, a border gateway protocol, BGP, protocol message transmitted from a second device, wherein the BGP protocol message carries a service identifier of the second device, establishing, by the first device, a corresponding relationship between the first device and the second device, according to a service identifier of the first device and the service identifier of the second device, and distributing, by the first device, an MPLS label for the corresponding relationship.

The present invention further discloses a network device, characterized in including a border gateway protocol, BGP, protocol message receiving unit, a corresponding relationship establishing unit, and an MPLS label distributing unit, wherein the BGP protocol message receiving unit receives a BGP protocol message transmitted from another network device, the BGP protocol message carrying a service identifier of the another network device, the corresponding relationship establishing unit establishes a corresponding relationship between the network device and the another network device according to a service identifier of the network device and the service identifier of the another network device, and the label distributing unit distributes an MPLS label for the corresponding relationship.

The present invention is advantageous as it realizes that the MPLS labels are distributed for certain specific logical relationship between two nodes in the BGP protocol, so that the network devices running the BGP protocol can efficiently obtain the MPLS label corresponding to the specific logical relationship.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

The present invention is described in detail below with reference to the accompanying drawings and specific embodiments. However, as should be noted, the embodiments as hereinafter described are merely examples listed to help understand the technical solutions, and are not meant to define the present invention.

Figure 1:
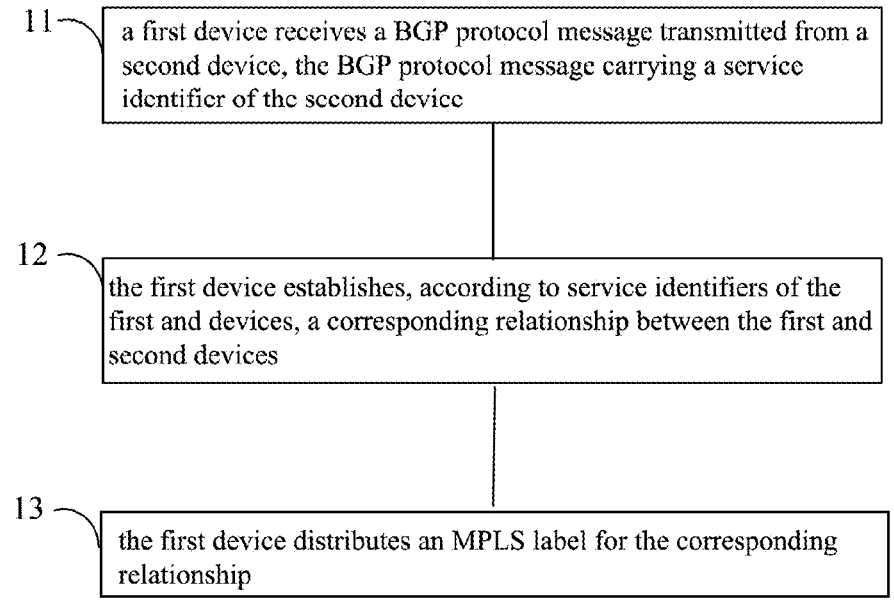
FIG. 1 is a flowchart illustrating the method according to an embodiment of the present invention.

According to an embodiment of the present invention, there is provided a method for distributing multi-protocol label switching (MPLS) labels for a network device, which method is applied in a network system that includes a first device and a second device, as shown in FIG. 1.

In Step 11, a first device receives a border gateway protocol (BGP) protocol message transmitted from a second device, wherein the BGP protocol message carries a service identifier of the second device.

In Step 12, the first device establishes, according to a service identifier of the first device and the service identifier of the second device, a corresponding relationship between the first device and the second device.

In Step 13, the first device distributes an MPLS label for the corresponding relationship.

Optionally, the service identifier of a device may include a device identifier of the device, so the service identifier of the first device and the service identifier of the second device include the device identifier of the first device and the device identifier of the second device, respectively. The device identifier is an identifier that is capable of uniquely identifying the device, such as the IP address of the device.

When the service identifier of the device include the device identifier of the device, a binary set (device identifier 1, device identifier 2) including two elements, namely the device identifier of the first device and the device identifier of the second device, may be used to represent the corresponding relationship between the first device and the second device.

Optionally, the service identifier of a device may also include a logic domain identifier of the device and the device identifier of the device. The logic domain is a virtual network formed by interconnecting at least two local area networks, hosts, routers or other network devices via the public network tunneling technology. Preferably, the logic domain includes the 3-layer virtual private network (L3VPN) and the 2-layer virtual private network (L2VPN), of which L2VPN includes the virtual private LAN service (VPLS) and the virtual private wire service (VPWS). Preferably, the logic domain identifier includes a route target (RT), a route distinguisher (RD), a virtual private LAN service identifier (VPLS ID), an attachment identifier (AI) and/or an attachment circuit identifier (ACI), etc.

Correspondingly, the service identifier of the first device includes the logic domain identifier of the first device and the device identifier of the first device, and the service identifier of the second device includes the logic domain identifier of the second device and the device identifier of the second device.

When the service identifier of the device include the logic domain identifier and the device identifier of the device, the first device determines whether the first device and the second device are located in the same logic domain according to the logic domain identifier of its own and the logic domain identifier of the second device.

If the first device and the second device are located in the same logic domain, the first device establishes the corresponding relationship between the first device and the second device.

It is possible to use a binary set including two elements, namely the device identifier of the first device and the device identifier of the second device, to represent the corresponding relationship between the first device and the second device, and it is also possible to use a ternary set including three elements, namely the same logic domain identifier, the device identifier of the first device and the device identifier of the second device, to represent the corresponding relationship between the first device and the second device.

Preferably, in this embodiment, the BGP protocol message is a BGP UPDATE message as defined in RFC4271 of the Internet Engineering Task Force (IETF).

Preferably, in this embodiment, the first device transmits the MPLS label to the second device, so that the second device uses the MPLS label to communicate with the first device.

After receiving the MPLS label transmitted from the first device, the second device uses the MPLS label to transmit a message to the first device, thus realizing communication with the first device.

Preferably, the first device may also transmit the BGP protocol message to the second device. The BGP protocol message carries the service identifier of the first device. The second device establishes a corresponding relationship between the first device and the second device according to the service identifier of the first device and the service identifier of the second device. The second device distributes an MPLS label for the corresponding relationship. Preferably, in this embodiment, the BGP protocol message is a BGP UPDATE message as defined in RFC4271 of the Internet Engineering Task Force (IETF).

The aforementioned method for the second device to distribute labels for the first device is essentially the same as the method for the first device to distribute labels for the second device in this embodiment.

The MPLS label distributed by the second device and the MPLS label distributed by the first device are independent of each other. Preferably, the second device transmits the MPLS label distributed thereby to the first device, and the first device communicates with the second device according to the MPLS label distributed by the second device. Thus, it is possible for either of the first device or the second device to communicate with the other by using the label distributed by the other.

Preferably, the first device and the second device are network devices capable of executing function of routing or switching, and include switches, routers, network devices based on packet switching, or multi-service access node devices.

Preferably, the network system may further include another network device, such as a third device, capable of executing function of routing or switching. Label distribution is performed between every two of the first device, the second device and the another network device capable of executing function of routing or switching, and each of the first device, the second device and the another network device capable of executing function of routing or switching communicate with a correspond party using the label distributed by the correspond party.

When any one of the first device, the second device and the another network device capable of executing function of routing or switching distributes MPLS labels for the other devices, different labels are distributed to the other devices.

For instance, when the first device, the second device and the third device distribute labels, the label 1-2 distributed by the first device for the second device is different from the label 1-3 distributed for the third device, thereby avoiding label conflict. By the same token, the label 2-1 distributed by the second device for the first device is different from the label 2-3 distributed for the third device.

In addition, with respect to a plurality of devices distributing MPLS labels for one another, such as the first device, the second device and the third device, the label distributed by one device for another device is independent of the label distributed by the another device for the device.

Figure 2:
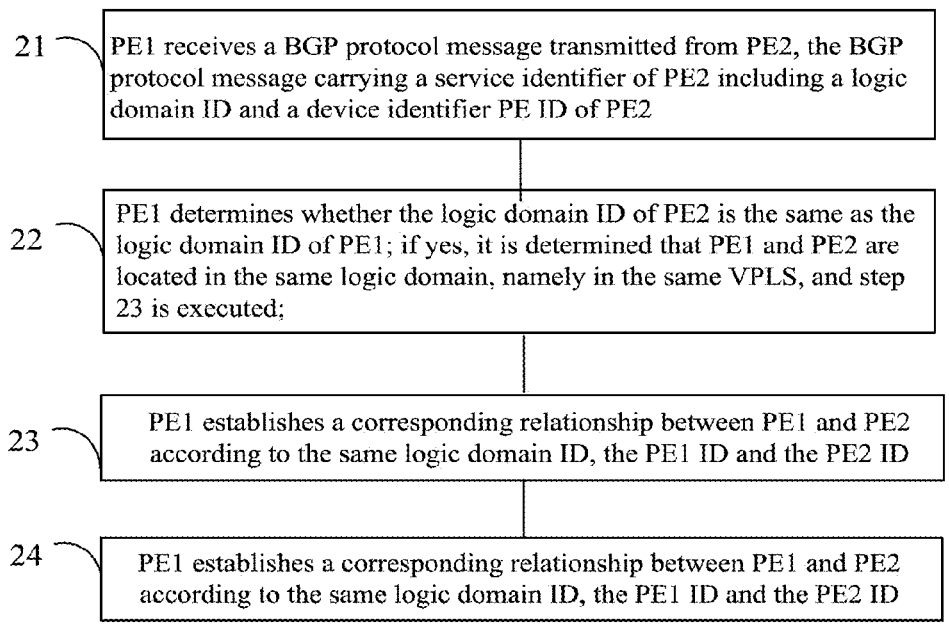
FIG. 2 is a flowchart illustrating the method according to an embodiment of the present invention.
Figure 3:
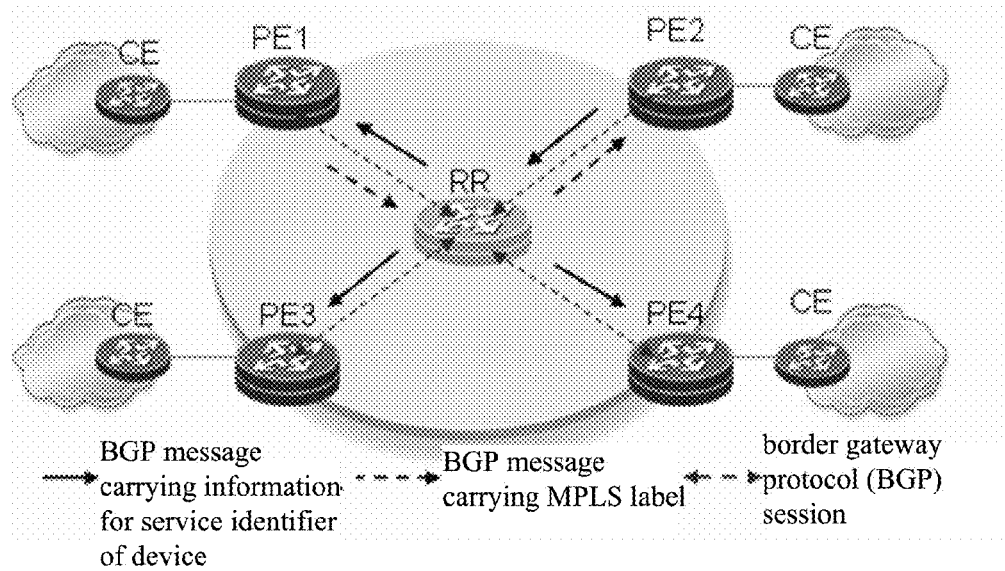
FIG. 3 is a schematic diagram illustrating the transmission and reception of a message according to an embodiment of the present invention.

As shown in FIG. 2, in one embodiment of the present invention, a network as shown in FIG. 3 and running L2VPN includes PE1 as a first device, PE2 as a second device, PE3 as a third device, PE4 as a fourth device, and a route reflector (RR). This embodiment is described as follows.

In Step 21, the PE1 receives a BGP protocol message transmitted from the PE2, the BGP protocol message carries a service identifier of the PE2, and the service identifier includes a logic domain ID and a device identifier PE ID of the PE2. In this embodiment, the logic domain ID of the PE1 is a route target (RT) 1, and the logic domain ID of the PE2 is RT2; the PE ID of the PE1 is PE1 ID, the PE ID of the PE2 is PE2 ID, and the logic domain in which the PE1 locates is an L2VPN, which includes the virtual private LAN service (VPLS) and the virtual private wire service (VPWS). Preferably, the PE ID is an IP address of PE; as shown in FIG. 3, the PE1 receives the BGP protocol message transmitted by the PE2 through the RR. Optionally, the logic domain ID may also be a route distinguisher (RD), a virtual private LAN service identifier (VPLS ID), an attachment identifier (AI) and/or an attachment circuit identifier (ACI), etc. Preferably, in this embodiment, the BGP protocol message is a BGP UPDATE message as defined in RFC4271 of the IETF.

In Step 22, the PE1 determines whether the logic domain ID of the PE2 is the same as the logic domain ID of the PE1; if yes, it is determined that the PE1 and PE2 are located in the same logic domain, namely in the same L2VPN, and Step 23 is executed.

In Step 24, the PE1 establishes a corresponding relationship between the PE1 and the PE2 according to the same logic domain ID, the PE1 ID and the PE2 ID. Preferably, the corresponding relationship may be represented by a ternary set (the same logic domain ID, PE1 ID, PE2 ID).

The PE1 distributes an MPLS label for the corresponding relationship between the PE1 and the PE2. Preferably, the PE1 distributes an MPLS label for the ternary set (the same logic domain ID, PE1 ID, PE2 ID).

Preferably, as shown in FIG. 3, after the PE1 has distributed the MPLS label, the PE1 transmits the MPLS label to the PE2. The PE1 may transmit the MPLS label to the RR, and then the RR transmits the MPLS label to the PE2.

Preferably, after receiving the MPLS label, the PE2 uses the MPLS label to encapsulate the message, and transmits the message encapsulated with the MPLS label to the PE1.

Figure 4:
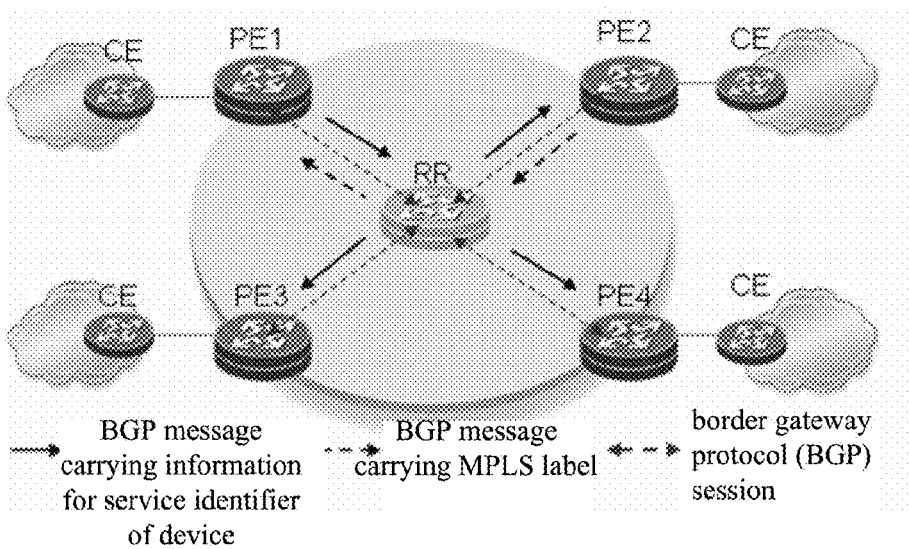
FIG. 4 is a schematic diagram illustrating the transmission and reception of a message according to an embodiment of the present invention.

Preferably, as shown in FIG. 4, the PE1 correspondingly transmits to the PE2 a BGP protocol message carrying the service identifier of the PE1; the PE2 determines whether the logic domain ID of the PE2 is the same as the logic domain ID of the PE1; if yes, the PE2 establishes a corresponding relationship between the PE2 and the PE1 according to the same logic domain ID, the PE1 ID and the PE2 ID; the PE2 distributes an MPLS label for the corresponding relationship between the PE2 and the PE1.

The MPLS label distributed by the PE1 and the label distributed by the PE2 are independent of each other. Thus, each of the PE1 and the PE2 receives an MPLS label distributed by the other. Thereafter, the PE1 and the PE2 respectively use the MPLS label distributed by the other to transmit messages to the other.

By the same token, the PE1 may also distribute labels for the PE3 and the PE4, and receive labels distributed by the PE3 and the PE4 therefore, whereby the PE1 and the PE3 each may use the MPLS label distributed by the other to transmit messages, and the PE1 and the PE4 each does also.

Further, for any two PEs of the PE1, the PE2, the PE3 and the PE4, one of the two PE can distribute an MPLS label for the other of the two PEs, and uses the MPLS label distributed by the other to communicate with the other.

One PE distributes different MPLS labels for the other, different PEs.

The MPLS labels distributed by different PEs are independent of one another.

Optionally, the network as recited in this embodiment may exclude the RR, in which case a full-link BGP session is established amongst each of the PEs. Correspondingly, the PE1 does not receive the BGP protocol message through the RR, and also does not transmit labels distributed for the other devices to the other devices through the RR.

In an embodiment of the present invention, a network running a 3-layer virtual private network (L3VPN) includes the PE1 and the PE2, and preferably also includes the PE3.

The embodiment according to the present invention is described as follows.

In Step 21, the PE1 receives a BGP protocol message transmitted from the PE2, the BGP protocol message carries a service identifier of the PE2, and the service identifier includes a logic domain ID and a PE ID of the PE2. In this embodiment, the logic domain IDs are route targets (RTs). Correspondingly, the logic domain ID of the PE1 is RT1, and the logic domain ID of the PE2 is RT2; the PE ID of the PE1 is PE1 ID, the PE ID of the PE2 is PE2 ID, and the logic domain in which the PE1 locates is an L3VPN. Optionally, the logic domain ID may also be a route distinguisher (RD), a virtual private LAN service identifier (VPLS ID), an attachment identifier (AI) and/or an attachment circuit identifier (ACI), etc. Preferably, the PE ID is an IP address of the PE or other information capable of uniquely identifying the PE. Preferably, in this embodiment, the BGP protocol message is a BGP UPDATE message as defined in RFC4271 of the IETF.

In Step 22, The PE1 determines whether the logic domain ID of the PE2 is the same as the logic domain ID of the PE1; if yes, step 23 is executed, wherein if the logic domain ID of the PE2 is the same as the logic domain ID of the PE1, this indicates that the PE1 and the PE2 are located in the same L3VPN.

In Step 23, The PE1 establishes a corresponding relationship between the PE1 and the PE2 according to the same logic domain ID, the PE1 ID and the PE2 ID. Preferably, the corresponding relationship may be represented by a ternary set (the same logic domain ID, PE1 ID, PE2 ID).

In Step 24, the PE1 distributes an MPLS label for the corresponding relationship between the PE1 and the PE2. Preferably, the PE1 distributes an MPLS label for the ternary set (the same logic domain ID, PE1 ID, PE2 ID).

Preferably, after the PE1 has distributed the MPLS label, the PE1 transmits the MPLS label to the PE2.

Preferably, after receiving the MPLS label, the PE2 encapsulates the message by using the MPLS label, and transmits the message encapsulated with the MPLS label to the PE1.

Preferably, the PE1 transmits to the PE2 a BGP protocol message carrying the service identifier of the PE1; the PE2 determines whether the logic domain ID of the PE2 is the same as the logic domain ID of the PE1; if yes, the PE2 establishes a corresponding relationship between the PE2 and the PE1 according to the same logic domain ID, the PE1 ID and the PE2 ID; the PE2 distributes an MPLS label for the corresponding relationship.

The MPLS label distributed by the PE1 and the label distributed by the PE2 are independent of each other. Thus, each of the PE1 and the PE2 receives an MPLS label distributed by the other. Thereafter, the PE1 and the PE2 respectively transmit messages to the other by using the MPLS labels distributed by the other.

An embodiment of the present invention is described as follows.

A network device, together with another network device, possesses capability to execute function of routing or switching, and is specifically a switch, a router, a multi-service access node or a network device based on packet switching, etc.

Figure 5:
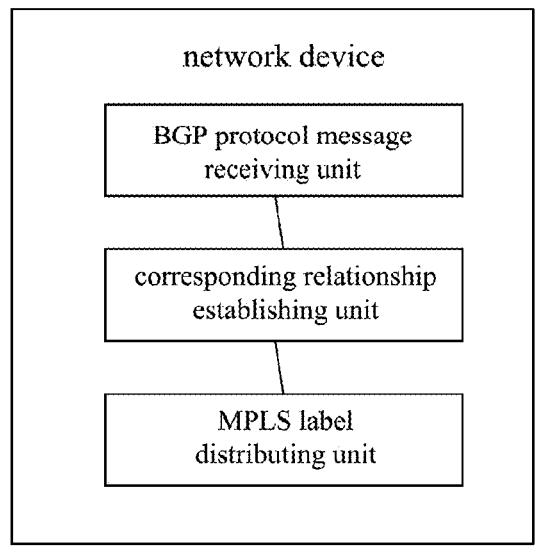
FIG. 5 is a schematic diagram illustrating the network device according to an embodiment of the present invention.

As shown in FIG. 5, the network device includes a BGP protocol message receiving unit, a corresponding relationship establishing unit, and an MPLS label distributing unit.

The BGP protocol message receiving unit receives a BGP protocol message transmitted from another network device, which BGP protocol message carries a service identifier of the another network device. Preferably, in this embodiment, the BGP protocol message is a BGP UPDATE message as defined in RFC4271.

Optionally, the service identifier is a device identifier of the another network device; alternatively, the service identifier is a logic domain identifier in the BGP protocol message and a device identifier of the another network device. The logic domain is a virtual network formed by interconnecting at least two local area networks, hosts, routers or other network devices via public network tunneling. Preferably, the logic domain includes the 3-layer virtual private network (L3VPN) and the 2-layer virtual private network (L2VPN), of which L2VPN includes the virtual private LAN service (VPLS) and the virtual private wire service (VPWS). The logic domain ID includes a route target (RT), a route distinguisher (RD), a virtual private LAN service identifier (VPLS ID), an attachment identifier (AI) and/or an attachment circuit identifier (ACI), etc. The device identifier of the another network device itself is a device identifier, such as the IP address of the another network device, capable of uniquely determining the another network device.

The corresponding relationship establishing unit establishes a corresponding relationship between the network device and the another network device according to a service identifier of the network device and the service identifier of the another network device.

The label distributing unit distributes an MPLS label for the corresponding relationship.

Preferably, the network device further includes an MPLS label transmitting unit.

The MPLS label transmitting unit transmits the MPLS label distributed by the network device to the another network device. After obtaining the MPLS label, the another network device can transmit a message to the network device by the MPLS label.

Figure 6:
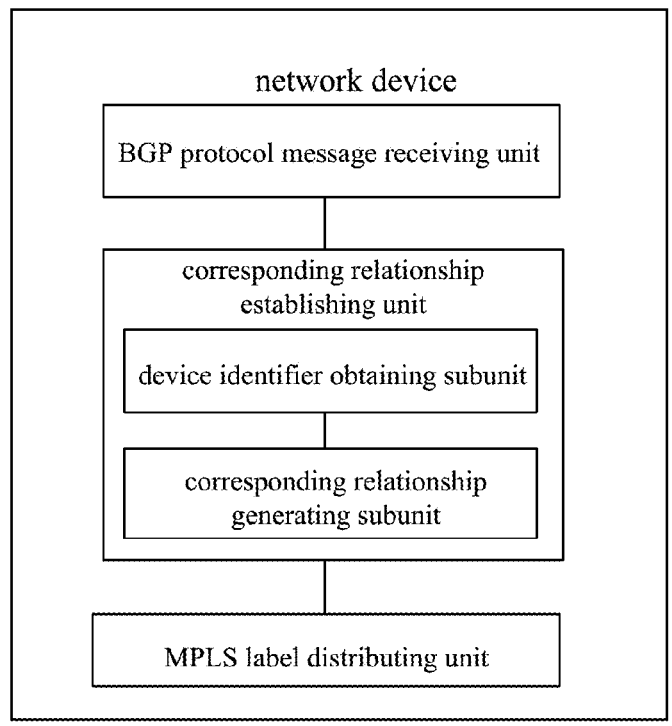
FIG. 6 is a schematic diagram illustrating the network device according to an embodiment of the present invention.

Optionally, as shown in FIG. 6, the corresponding relationship establishing unit includes a device identifier obtaining subunit and a corresponding relationship generating subunit. The corresponding relationship establishing unit is used in the case the service identifier is the device identifier.

The device identifier obtaining subunit obtains a device identifier of the network device itself and a device identifier of the another network device.

The corresponding relationship generating subunit associates the device identifier of the network device with the device identifier of the another network device, and establishes a corresponding relationship between the network device and the another network device.

Preferably, the corresponding relationship between the network device and the another network device may be represented by a binary set that includes two elements, namely the device identifier of the network device and the device identifier of the another network device.

Figure 7:
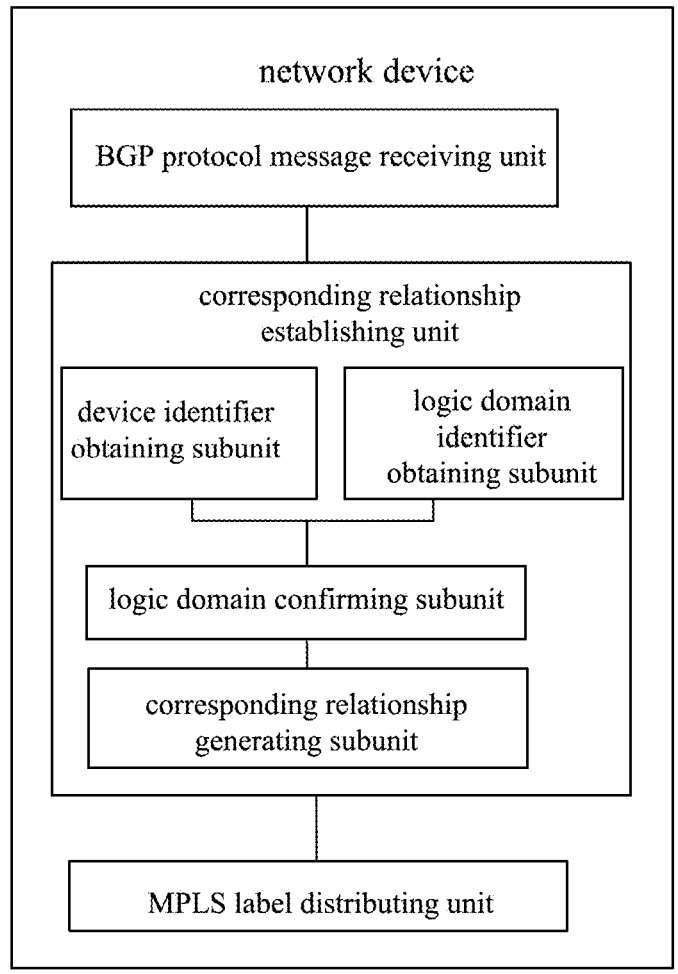
FIG. 7 is a schematic diagram illustrating the network device according to an embodiment of the present invention.

Optionally, as shown in FIG. 7, the corresponding relationship establishing unit includes a device identifier obtaining subunit, a logic domain identifier obtaining subunit, a logic domain confirming subunit, and a corresponding relationship generating subunit. The corresponding relationship establishing unit is used in the case the service identifier is the device identifier and the logic domain identifier.

The device identifier obtaining subunit obtains a device identifier of the network device itself and a device identifier of the another network device.

The logic domain identifier obtaining subunit obtains a logic domain identifier of the network device itself and a logic domain identifier of the another network device.

The logic domain confirming subunit confirms whether the network device and the another network device are located in the same logic domain according to the logic domain identifier of the network device itself and the logic domain identifier of the another network device.

The corresponding relationship generating subunit associates the device identifier of the network device with the device identifier of the another network device, and establishes a corresponding relationship between the network device and the another network device, after it is determined that the network device and the another network device are located in the same logic domain.

Preferably, the corresponding relationship between the network device and the another network device may be represented by a ternary set that includes three elements, namely the same logic domain identifier, the device identifier of the network device and the device identifier of the another network device; alternatively, the corresponding relationship between the network device and the another network device may be represented by a binary set that includes two elements, namely the device identifier of the network device and the device identifier of the another network device.

As comprehensible to persons ordinarily skilled in the art, the entire or partial steps of the aforementioned method embodiments can be realized by relevant hardware(s) instructed by a program, and the program can be stored in a computer-readable storage medium and carry out the steps of the aforementioned method embodiments when executed. The storage medium includes such various media capable of storing program codes as an ROM, an RAM, a magnetic disc or an optical disc, and so on.

The above is merely directed to preferred specific embodiments of the present invention, but the protection scope of the present invention is not limited thereto, as any modifications or substitutions easily conceivable to persons skilled in the art within the technical scope as herein disclosed shall all be covered by the protection scope of the present invention.

What is claimed is:
1. A method for distributing multi-protocol label switching, MPLS, labels, comprising:
receiving, by a first provider edge, PE, device, a border gateway protocol, BGP, protocol message transmitted from a second PE device, wherein the BGP protocol message carries a service identifier of the second PE device, wherein the service identifier of the second PE device comprises a logic domain identifier of the second PE device and a device identifier of the second PE device;

determining, by the first PE device, whether the first PE device and the second PE device are located in a same logic domain according to a logic domain identifier of the first PE device and the logic domain identifier of the second PE device;

establishing, according to a device identifier of the first PE device and the device identifier of the second PE device, by the first PE device, a corresponding relationship between the first PE device and the second PE device in response to determining that the first PE device and the second PE device are located in the same logic domain; and distributing, by the first PE device, an MPLS label for the corresponding relationship.

2. The method according to claim 1, wherein the corresponding relationship between the first PE device and the second PE device is represented by using a binary set comprising the device identifier of the first PE device and the device identifier of the second PE device.

3. The method according to claim 1, wherein the corresponding relationship between the first PE device and the second PE device is represented by using a ternary set comprising the same logic domain identifier, the device identifier of the first PE device and the device identifier of the second PE device.

4. The method according to claim 1, wherein the logic domain identifier comprises a route target (RT), a route distinguisher (RD), a virtual private LAN service identifier (VPLS ID), an attachment identifier (AI) and/or an attachment circuit identifier (ACI).

5. The method according to claim 1, wherein the method further comprises: transmitting, by the first PE device, the MPLS label to the second PE device, wherein the MPLS label is used for encapsulating the message by the second PE device, and the encapsulated message is transmitted to the first PE device.

6. A network device, comprising: a border gateway protocol, BGP, protocol message receiving unit, a corresponding relationship establishing unit, and an MPLS label distributing unit; wherein the BGP protocol message receiving unit receives a BGP protocol message transmitted from another network device, the BGP protocol message carrying a service identifier of the another network device;

the corresponding relationship establishing unit establishes a corresponding relationship between the network device and the another network device according to a service identifier of the network device and the service identifier of the another network device; and the label distributing unit distributes an MPLS label for the corresponding relationship;

wherein the corresponding relationship establishing unit comprises a device identifier obtaining subunit, a logic domain identifier obtaining subunit, a logic domain confirming subunit, and a corresponding relationship generating subunit; wherein the device identifier obtaining subunit obtains a device identifier of the network device itself and a device identifier of the another network device;

the logic domain identifier obtaining subunit obtains a logic domain identifier of the network device itself and a logic domain identifier of the another network device;

the logic domain confirming subunit confirms whether the network device and the another network device are located in a same logic domain according to the logic domain identifier of the network device itself and the logic domain identifier of the another network device; and the corresponding relationship generating subunit associates the device identifier of the network device with the device identifier of the another network device, and establishes a corresponding relationship between the network device and the another network device, after it is determined that the network device and the another network device are located in the same logic domain.

7. The network device according to claim 6, further comprising an MPLS label transmitting unit that transmits the MPLS label distributed by the network device to the another network device.

8. The network device according to claim 6, wherein the corresponding relationship generating subunit represents the corresponding relationship between the network device and the another network device with a ternary set that comprises the same logic domain identifier, the device identifier of the network device and the device identifier of the another network device.

9. The network device according to claim 6, wherein the corresponding relationship generating subunit represents the corresponding relationship between the network device and the another network device with a binary set that comprises the device identifier of the network device and the device identifier of the another network device.

10. A computer program product, comprising computer executable instructions stored on a non-transitory computer readable medium, wherein when the instructions are executed by a processor of a first provider edge, PE, device, causes the processor to:

receive a border gateway protocol, BGP, protocol message transmitted from a second PE device, wherein the BGP protocol message carries a service identifier of the second PE device, wherein the service identifier of the second PE device comprises a logic domain identifier of the second PE device and a device identifier of the second PE device;

determine whether the first PE device and the second PE device are located in a same logic domain according to a logic domain identifier of the first PE device and the logic domain identifier of the second PE device;

establish, according to a device identifier of the first PE device and the device identifier of the second PE device, a corresponding relationship between the first PE device and the second PE device in response to determining that the first PE device and the second PE device are located in the same logic domain; and distribute an MPLS label for the corresponding relationship.

11. The product according to claim 10, wherein the corresponding relationship between the first PE device and the second PE device is represented by using a binary set comprising the device identifier of the first PE device and the device identifier of the second PE device.

12. The product according to claim 10, wherein the corresponding relationship between the first PE device and the second PE device is represented by using a ternary set comprising the same logic domain identifier, the device identifier of the first PE device and the device identifier of the second PE device.

13. The product according to claim 10, wherein the instructions further cause the processor to:
    transmit the MPLS label to the second PE device, wherein the MPLS label is used for encapsulating the message by the second PE device, and the encapsulated message is transmitted to the first PE device.

\* \* \* \* \*